Figure 1:
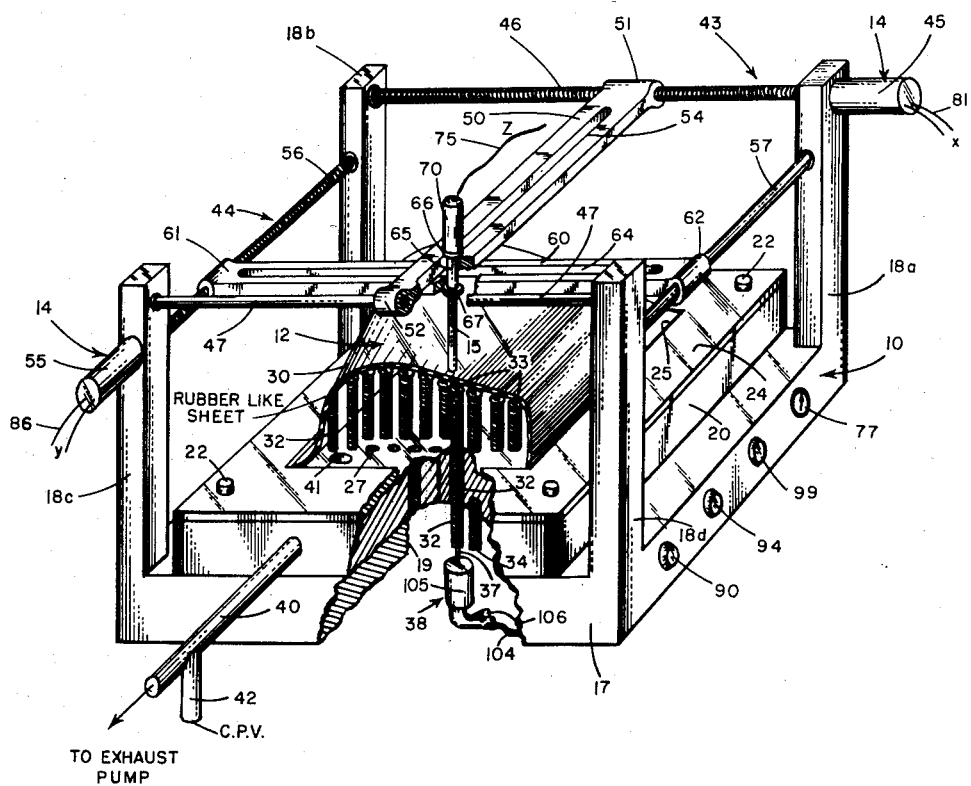

Jan. 13, 1959

W. L. POLAND 2,869,058

SERVOSYSTEM FUNCTION GENERATOR

Filed May 6, 1955

2 Sheets-Sheet 1

FIG. I

INVENTOR.
WILLIAM L. POLAND

BY William R. Sherman

HIS ATTORNEY

United States Patent Office 2,869,058
Patented Jan. 13, 1959

2,869,058
SERVOSYSTEM FUNCTION GENERATOR

William L. Poland, Bethel, Conn., assignor, by mesne assignments, to Schlumberger Well Surveying Corporation, Houston, Tex., a corporation of Texas Application May 6, 1955, Serial No. 506,540

15 Claims. (Cl. 318—28)

This invention relates to function generators and more particularly to computing apparatus for generating a function of two variables.

In a variety of control and computing systems, a need is encountered for reliable and accurate representations of a function of two variables. Generally, the function to be represented will not be an explicit mathematical relationship but rather a non-linear, empirical relationship. An example of such a function is that utilized in the servo control system disclosed in Patent No. 2,463,362, issued March 1, 1949, to H. G. Doll, whereby an optimum system response is obtained.

One manner of representing a function of two variables is by means of a three dimensional cam. To impart a predetermined contour to such a cam has in the past been an expensive undertaking. Thus, three dimensional cams have been produced either by lengthy and painstaking machining with human supervision or by complex automatic machinery controlled by coded manifestations of the desired contour. With either of these expensive modes of production, a new cam must be machined whenever the contour desired is modified or the contour obtained is found to be undersized. For these reasons, use of three-dimensional cams has heretofore been justified only where large numbers are produced from an expensive master cam by economical casting techniques or where the reliability and small packaging possible with such cams are prime considerations. Even when a cam conforming accurately to a desired function is obtained, it may occur that the cam following mechanism has a systematic error. With a rigid cam surface, the error is not susceptible to compensation without a redesign and reconstruction of the cam itself or of the following mechanism.

Accordingly, it is an object of the present invention to provide new and improved function generating apparatus for overcoming these disadvantages which have hitherto attended a use of three-dimensional cams.

Another object of the invention is to provide new and improved apparatus for generating a function of two variables, particularly an empirical and non-linear function.

Another object is to provide such apparatus which has a high degree of reliability and accuracy.

Yet another object is to provide new and improved apparatus for accurately generating a three-dimensional cam.

Still another object is to provide a three-dimensional cam readily modified for conformance with a desired contour.

These and other objects are attained, in accordance with the invention, by utilizing a three-dimensional cam formed with a flexible surface. In order to conform this flexible surface to the desired function, elements contacting one side of the surface are adjustably positioned to displace the surface until desired deflections of a cam follower are produced. The adjustment of each element is accomplished by placing a servomotor in driving connection therewith and energizing it by a signal representing the difference between the desired deflection of the cam follower and the detected deflection of the cam follower when such follower is positioned opposite the adjustable element. With each of the elements properly adjusted, the cam follower is movable to a position on the cam surface determined by two input variables. In proportion to the deflection of the follower, a signal is generated representing the dependent function value corresponding to the two input variables.

Figure 2:
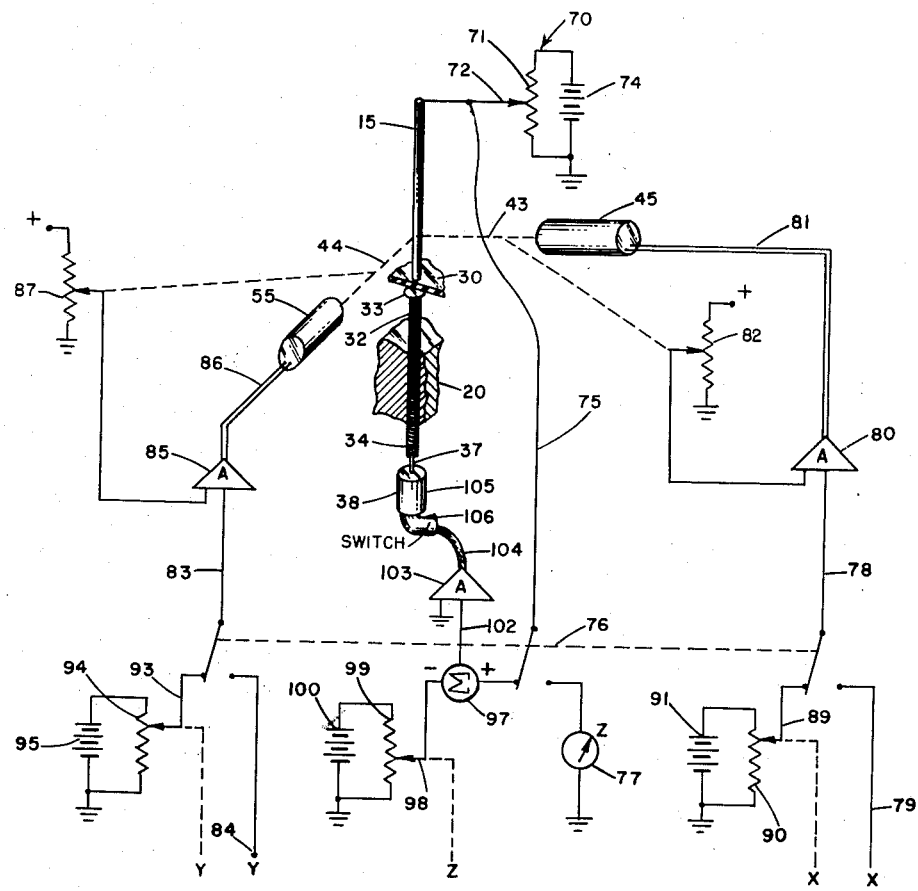

The invention, together with others of its objects and advantages, will be clearly understood fom the following detailed description taken in conjunction with the drawings, in which:

Fig. 1 is an isometric view of computing apparatus constructed in accordance with the present invention, certain portions being cut away for clarity of illustration; and Fig. 2 is a schematic diagram for the apparatus of Fig. 1.

In the figures, like numerals are employed to designate like parts.

There is shown in Fig. 1 a base 10 for supporting both a flexible three-dimensional cam 12 and a servomechanism 14 to position a cam follower 15 in relation to the cam 12. The base 10, more particularly, is of an open rectangular form having upstanding legs 18a–d at its four corners for supporting the servomechanism 14. An aperture 19 defined by the base 10 is likewise rectangular and is sized to accommodate mechanism to be described hereafter for adjusting the contour of the cam.

Secured to the base 10 between the legs 18a–d is a rectangular plate 20. This plate 20 is fixed in relation to the base 10 and hence in relation to the servomechanism 14 by fastening means such as bolts 22. These same bolts 22 secure to the top of the plate 20 a retaining frame 24 having an aperture 25 which is rectangular. At a plurality of points on the face of the plate 20 spaced within the aperture 25 in an array of rows and columns are threaded holes 27 passing perpendicularly through the plate.

To render the cam 12 flexible and thus adapt it to modification and accurate conformation to a desired contour, the cam comprises a thin sheet 30 of a relatively flexible material which preferably is smooth, somewhat resilient, stable in thickness, and wear-resistant. Thus, the sheet 30 may be composed of rubber or a rubber-like plastic, for example. The edges of the sheet 30 extend between the plate 20 and the frame 24 and are compressed therebetween in sealed relation. If desired, the seal afforded by compression between the plate 20 and frame 24 may be improved with the use of a sealing wax or grease. Thus, while portions of the sheet 30 are cut away for purposes of illustration, the sheet actually extends continuously across the entire aperture 25 of the retaining frame 24.

To generate the desired cam surface, screws 32 are threaded in each of the holes 27 through the plate 20. Each of these screws 32 has a fine pitch conforming to the thread pitch of the holes 27 and permitting extremely accurate adjustment of the screw position relative to the plate 20. At the end of each screw contacting the undersurface of the cam sheet 30 is a smooth, rounded head 33, the radius of curvature of such head being related to the smallest radius of curvature which may be imparted to the cam surface. At the opposite end of each screw 32 is a slot 34 for receiving blade 37 of a motor driven screwdriver 38 or, of course, the blade of a hand screwdriver, if desired. Each of the screws 32 is of sufficient length to raise the sheet 30 thereabove for a maximum deflection of the cam follower 15 while the slotted end yet extends beneath the plate 20 into the aperture 19.

While tension forces in the sheet 30 will cause the sheet to conform to the positions of the screw heads 33 where the locus of the screw heads is a convex surface, the sheet will tend to bridge across regions where the locus of the screw heads is a concavity. To ensure the conformation of the sheet 30 to the surface determined by the locus of screw heads 33, an exhaust conduit 40 extends from an aperture 41 underlying the sheet 30 through the plate 20 and out the side thereof for connection to a suitable vacuum pump (not shown). Connected in the conduit 40 is a constant pressure valve 42 which may be adjusted to secure any desired partial vacuum in the volume enclosed by the sheet 30 and the top face of the plate 20. If desired, the screw threads may be coated with a suitable sealing composition to reduce leakage of air through the threaded holes 27 into the low pressure region.

The positioning of the screws 32 in an array of rows and columns permits the displacement of the sheet 30 above the plate 20 to be related in terms of a coordinate grid comprising parallel row lines and parallel column lines through the axes of the screws. The screws 32 thus may be considered as located at cross points of a rectangular coordinate grid. Advantageously, the probe 15 is positioned in relation to this same rectangular coordinate grid. Accordingly, the servomechanism 14 comprises one portion 43 for determining the position of the probe 15 in relation to one coordinate of the grid and another portion 44 for determining the position of the probe 15 simultaneosly in terms of the other coordinate of the grid.

To this end, the portion 43 of the positioning servomechanism 14 includes a servomotor 45 responsive to an input variable $x$ and in driving connection with a screw shaft 46. The servomotor 45 is non-rotatably supported on leg 18a, while the shaft 46 is journaled in adjacent legs 18a, 18b. The shaft 46 extends in parallel relation to the plate 20, as does a smooth guide rod 47 supported by legs 18c and 18d. Extending in parallel relation to the plate 20 over the cam surface is a traverse bridge 50 having at one end a threaded bearing 51 in driving connection with the screw shaft 46 and at the other end having a smooth bearing 52 in sliding connection with guiding rod 47. These bearings 51, 52 preferably have a sufficient purchase upon the shaft 46 and rod 47 to ensure that the bridge 50 will move in parallelism when driven by the servomotor 45. The bridge 50 is further provided with a longitudinal slot 54 extending parallel to the columnar lines in the coordinate grid.

The portion 44 of the positioning servomechanism 14, which is responsive to the second input variable $y$, comprises a servomotor 55 secured to leg 18c and in driving connection with a threaded screw shaft 56. This screw shaft 56 is journaled in the legs 18b, 18c somewhat below the screw shaft 46 and guide rod 47. Supported in parallel relation to the screw shaft 56 on the opposite legs 18a, 18d is a guide rod 57. In similarity to the portion 43 of the servomechanism 44, there is provided a traverse bridge 60 having at one end a threaded bearing 61 in driving connection with the screw shaft 56 and at the other end a smooth bearing 62 for sliding along the guide rod 57. Likewise, there is provided a longitudinal slot 64 in the bridge 60 extending in transverse relation to the slot 54 and, hence, in parallel relation to the row lines of the rectangular coordinate grid.

To obtain a simultaneous placement of the cam follower 15 by the servomechanism portions 13, 14 in response to both of the input variables $x$, $y$, the cam follower 15 is supported in a collar 65 slidably fitted through the slots 54, 64 at their intersection and retained therein by flanges 66, 67. As the flange 66 bears against the upper surface of the bridge 50 and flange 67 against the lower surface of bridge 60, the collar 65 will be retained at a constant height or displacement from the top surface of the plate 20 regardless of the position of the bridges. Hence, movement of the cam follower 15 relative to the collar 65 will be dependent upon the displacement of sheet 30 defining the cam surface from the top of the plate 20. As an assurance of this, the cam follower 15 may be resiliently urged relative to the collar 65 into engagement with the cam surface, especially in the event that gravitational forces cannot be relied upon to secure contact between the follower and the surface.

To detect relative movement between the cam follower 15 and the retaining collar 65, a device 70 responsive to linear motion of the cam follower 15 is secured to the flange 66 of the collar. While the device 70 may have a variety of forms, a high degree of reliability is secured where the device 70 is a linear potentiometer. As seen in Fig. 2, this potentiometer 70 includes a resistance element 71 which is fixed to the collar 65 and a wiper 72 which is secured to the cam follower 15. To apply a voltage to the wiper 72 proportioned to the displacement of the follower, a battery 74 or like source of regulated potential is connected across the resistance element 71 and may be grounded at its negative terminal.

An indication of the potential on the wiper 72 is derived by the connection of wiper 72 through a flexible insulating conductor 75 and a triple pole, double throw normal switch 76 to an indicating device 77. Device 77 may, for example, be a galvanometric type recorder or simply a voltmeter, as desired. When switch 76 is in its "operate" position connecting line 75 with the indicating device 77, a conductor 78 connects an input terminal 79 for the $x$ input variable to a servo amplifier 80. The output of this amplifier 80 is coupled by a line 81 to the servomotor 45 for positioning the probe 15 in terms of one coordinate. To null the signal applied to servomotor 45 when the probe is positioned in correct correspondence with the $x$ variable, a position pick-off potentiometer 82 has its wiper mechanically driven by servomotor 45 and electrically connected to the input of servo amplifier 80 in opposition to the input applied via conductor 78, thereby to supply a degenerative potential with respect to ground corresponding to the position of the probe 15 in the $x$ coordinate. Also in this operate position a conductor 83 connects an input terminal 84 for the $y$ variable to the input of a servoamplifier 85. This amplifier 85 is, in turn, coupled by line 86 to the servomotor 55 for positioning probe 15 in relation to the other coordinate. Position feedback is derived from a potentiometer 87 having its wiper mechanically driven by servomotor 55 and electrically connected to the input of amplifier 85 in a manner similar to potentiometer 82.

In the alternate "adjust" position of the switch 76, adjustment or generation of the cam surface is effected. Conductor 78 in this switch position connects with wiper 89 of a potentiometer 90 which in turn is connected across a battery 91 having a grounded negative terminal. As indicated in Fig. 2, the wiper 89 may be mechanically positioned in accordance with a selected value of the input variable $x$. Similarly, conductor 83 connects with wiper 93 of a potentiometer 94 which likewise is connected across a battery 95 having a grounded negative terminal. Here, the wiper 93 is arranged for a mechanical input of a value of the $y$ variable. Conductor 75 coupled to the follower pick-off potentiometer 70 is connected, in the adjust position of the switch 76, with a difference taking element 97 such as a differential amplifier. The other input of the difference taking element 97 is connected to wiper 98 of a potentiometer 99 having connected across it a battery 100 with a grounded negative terminal. Wiper 98 is arranged for mechanical input of a value of the $z$ function prescribed in accordance with the values of $x$ and $y$ mechanically entered on potentiometers 90 and 94, respectively.

The output of the difference taking element 97, which may be positive or negative depending upon whether the probe deflection is high or low, is supplied by a conductor 102 to a servo amplifier 103. The output of the servo amplifier 103 is coupled by line 104 to a servomotor 105 incorporated in the motor-driven screwdriver 38. For convenience, the screwdriver 38 may, like familiar hand power drills, have a handle grip switch 106.

In order to generate a cam surface representing a function of two variables which may be both empirical and non-linear, the switch 76 is set over to its adjust position and, especially if the function is expected to result in concavities, the region enclosed by the sheet 30 is evacuated to a desired pressure. With the apparatus in a suitable orientation to make accessible the slotted ends of the screws 32, a particular set of $x$ and $y$ values and the corresponding $z$ value, which may be derived from a prepared function table, are manually set into the potentiometers 90, 94 and 99, respectively. Preferably, the $x$ and $y$ values will correspond to the exact location of a particular screw 32, that is, they will be represented on the coordinate grid by a particular cross point. The potentials on wipers 89 and 93 corresponding to the manual $x$ and $y$ input values are applied to the servo amplifiers 80, 85, respectively to energize the corresponding servomotors 45, 55. In following the intersection point of the slots 54, 64 in the traverse bridges 50, 60, the follower 15 will be driven to a position corresponding to the $x$ and $y$ input variables. If the cross-point values of $x$ and $y$ are applied, the follower 15 will be exactly opposite one of the heads 33 of the screws 32.

In order to adjust the displacement of the cam surface defined by the sheet 30 to obtain an indicated value of $z$ identical with the tabulated value manually introduced into potentiometer 99, the servomotor screwdriver 38 is manually placed in driving connection with the screw which is aligned with the cam follower. The energizing switch 106 of the servomotor screwdriver 38 is then closed whereby the servomotor 105 is supplied with the error signal from the difference taking element 97. If the cam surface displacement is too low, a negative error signal will be applied to the servomotor 105 causing the blade 37 to rotate the screw 32 in a direction producing upward movement. Conversely, if the displacement is too high, a positive error signal is applied to servomotor 105 to produce downward movement. The screwdriver 38 will continue to adjust the position of the screw 32 until a zero error signal is obtained. This null condition will be indicative that the potential on the wiper 72 is equal to the potential on the wiper 98, that is, that the value of $z$ detected by the follower 15 is equal to the value of $z$ manually entered on the potentiometer 99.

Thereupon, the next set of $x$, $y$ and $z$ values are manually entered in potentiometers 90, 94 and 99 to move the follower over to the next adjacent cross-point. The operation is then repeated. If the adjustment of the screws is very substantial, it may be necessary to repeat the adjustment of the screws in order to correct for mutually introduced errors. When the entire cam surface has been brought into conformity with the contour representative of the desired function, the switch 76 may be thrown into the "operate" position and signals representing the variables $x$ and $y$ applied to the terminals 79, 84. The cam follower 15 is then moved continuously in correspondence with the instantaneous values of the input signals $x$ and $y$, thereby to produce a continuous signal indicated on device 77 of a value determined by the deflection of the cam follower and representing the function value $z$.

Since at every cross-point the cam surface is adjusted to give the desired output value of $z$ for each set of input values $x$, $y$, this function generator necessarily will yield the desired value $z$ for similar sets of $x$ and $y$ values. Where the $x$ and $y$ input signals position the follower at a point other than a cross-point for the coordinate grid, the $z$ value derived from the pick-off potentiometer 70 will represent an interpolation between the exact or true values at the surrounding cross-points. It will be appreciated that this interpolation is not merely a linear approximation between two adjacent values but a higher order of approximation between the four $z$ values at the nearest cross-points and to a lesser degree the $z$ values at more remote cross-points. In consequence, a more accurate interpolation may be secured, at least for functions having very irregular defining surfaces. As a result of this effective interpolation, a function may accurately be represented by the use of a relatively limited number of surface adjusting elements or screws.

Within the principles of the invention evidenced by the foregoing description, a goodly number of modifications may be made. Thus, in lieu of the rectangular coordinate grid, a polar coordinate grid or another coordinate system may be employed for ease in representing particular functions. In such case, both the positioning servomechanism for the cam follower and the positions for the screws or other surface adjusting elements are desirably made to conform to the particular coordinate system used. With any coordinate system, it is not necessary that the surface defining elements or screws be located at the cross-points of the coordinate grid, although such location facilitates the preparation of a table of $x$, $y$ and $z$ values to be employed in adjusting the cam surface. The adjustment of the cam surface may be further facilitated by using the positioning servomechanisms 14 or a like servomechanism to position the motorized screwdriver 38. In this manner, difficulties are avoided in determining which screw requires adjustment for any particular position of the cam follower. On the other hand, a manual drive for the follower positioning mechanism may be employed for the sake of economy. Furthermore, smooth eccentric pins may be used in lieu of the surface adjusting screws, such pins having an eccentricity whereby they may be advanced into a desired height and rotated into a locked position.

For convenient access to the slotted ends of the adjusting screws 32, the apparatus of Fig. 1 may be constructed normally to have a position inverted with respect to the illustrated position. Rather than reducing the pressure between the sheet 30 and the plate 20, the region on the cam follower side of the sheet 30 may be enclosed and placed under a pressure which would conform the sheet to concavities in the defining locus of the screw heads 33. If no such concavities existed for a particular function, of course, no pressure differential would be required. In lieu of establishing a pressure differential where needed, the heads 33 of the screws may be imbedded in the sheet 30 or inserted in retaining sockets formed therein so as to secure conformance of the sheet to the position of the screw heads.

In lieu of the pick-off potentiometer 70 used to detect the position of the cam follower 15, a magnetic type of position detector might be employed such as a linear differential transformer. The signal derived from the pick-off potentiometer 70 or alternative detecting device may be furnished to a variety of utilization devices other than the indicating device 77. Thus, where the function generator of this invention is employed directly in a servo control loop, the signal on line 75 might be furnished to the next succeeding portion of the servo loop. If desired, the apparatus may be employed to generate a cam surface using the flexible cam as a mold form to enable casting of identical cam surfaces with the same high degree of accuracy as that obtained with the precision adjustment of the flexible cam surface. The flexible cam may, of course, be readjusted to represent a variety of functions.

The invention, therefore, is not to be limited to the illustrated embodiment but is of a scope defined in the appended claims.

I claim:
1. In a function generator, the combination comprising a flexible member for defining a cam surface, a plurality of surface adjusting elements arranged in a two-coordinate array for adjustably displacing said surface, and means for detecting the displacement of said surface at a selected point thereon relative to a reference surface.

2. In a function generator, the combination comprising a flexible member for defining a cam surface, a plurality of surface adjusting elements arranged in a two-coordinate array for adjustably displacing said member, a cam follower, means for positioning said follower at a selected point on said surface, and means associated with said follower for detecting the displacement of said surface at said point relative to a reference surface.

3. In a function generator, the combination comprising a base, a flexible member for defining a cam surface having edge portions secured to said base, a plurality of surface adjusting elements movably supported in said base and arranged in a two-coordinate array for adjustably displacing said member relative to said base, a cam follower, means for positioning said follower at a selected point on said surface, and means associated with said follower for detecting the displacement of said surface at said point.

4. In a function generator, the combination comprising a base, a sheet-like flexible member for defining a cam surface having edge portions secured to said base, a plurality of screws threaded in said base and arranged in a two-coordinate array, said screws having heads engageable with said member for adjustably displacing the same relative to said base, a cam follower, means for positioning said follower at a selected point on said surface, and means associated with said follower for detecting the displacement of said surface at said point.

5. In a function generator, the combination comprising a base, a sheet-like flexible member for defining a cam surface having its edges secured to said base, a plurality of screws threaded through said base and arranged in a two-coordinate array intermediate said edges, said screws having heads engageable with said flexible member for defining the contour thereof, a cam follower, means for positioning said follower at a selected point on the side of said flexible member opposite from said screw heads, and means associated with said follower for detecting the displacement of said surface at said point relative to a reference plane.

6. In a function generator, the combination comprising a base, a sheet-like flexible member for defining a cam surface having edge portions secured to said base, a plurality of surface adjusting elements uniformly spaced in a two-coordinate rectangular array for adjustably displacing said member relative to a said base, a cam follower, servo-positioning means responsive to two input signals for positioning said follower at a point on said surface representing the instantaneous values of said input signals relative to said coordinate grid, and means associated with said follower for detecting the displacement of said surface at said point.

7. In a function generator, the combination comprising a flexible member for defining a cam surface, a plurality of surface adjusting elements arranged in a two-coordinate array for adjustably displacing said member from a reference plane, a cam follower, servo-positioning means for positioning said follower at a selected point on said surface, a potentiometer supported by said servo means for detecting relative movement of said follower whereby to provide a signal proportion to the displacement of said surface at a point contacted by said follower, and indicating means coupled to said potentiometer for indicating a value of displacement functionally related to said two input signals.

8. In a control system, a function generator comprising a flexible member for defining a cam surface, a plurality of surface adjusting elements arranged in a two-dimentional array for conforming said member to a contour having a displacement with respect to a reference plane representative of a predetermined function of two variables, a cam follower, servo means responsive to signals representing said two variables for positioning said follower at a point on said surface corresponding to said two variables, and means associated with said follower for generating a signal determined by the displacement of said surface at said point.

9. In a function generator, a three-dimensional cam comprising a plate, a flexible sheet-like member for defining a cam surface having its edges secured in sealed relation to said plate, a plurality of screws threaded through said plate and spaced in a two-coordinate array, said screws having heads engageable with said flexible member to determine the contour thereof, and conduit means communicating with the region enclosed by said plate and said flexible member to permit a reduction in pressure in said enclosed region.

10. In a function generator, the combination comprising a flexible member for defining a cam surface, a plurality of surface adjusting elements arranged in a two-coordinate array for adjustably displacing said surface from a reference plane, a cam follower for positioning at a selected point on said surface, means associated with said follower for detecting the displacement of said surface at said point, and means for selectively adjusting said elements to render the detected displacement of said surface equal to a desired displacement.

11. In a function generator, the combination comprising a plate, a flexible member for defining a cam surface having edge portions secured to said plate, a plurality of surface adjusting elements movably supported in a two-coordinate array by said plate for adjustably displacing said surface, a cam follower, means for positioning said follower at a selected point on said surface, means associated with said follower for detecting the displacement of said surface at said point relative to said plate, and means responsive to the detected displacement for selectively moving said adjusting elements until a desired displacement is obtained at said point.

12. In a function generator, the combination comprising a base, a flexible member for defining a cam surface having edge portions secured to said base, a plurality of surface adjusting screws threaded in said base in a two-coordinate array for adjustably displacing said member, a cam follower for contacting a point on said surface, means associated with said follower for generating a signal proportional to the displacement of said surface at said point, adjustable means for providing a signal proportional to a desired displacement of said surface at said point, and screwdriving means including a servomotor responsive to the difference between said signals for selectively adjusting said screws until the desired displacement is obtained.

13. In apparatus for generating a three-dimensional cam, the combination comprising a base, a flexible member for defining a three-dimensional cam surface having edge portions secured to said base, a plurality of surface adjusting elements supported in said base in a two-coordinate array and movable relative to said base for adjustably displacing said member, a cam follower, means for positioning said follower at a selected point on said surface, means associated with said follower for generating a signal which is a function of the displacement of said surface at said point relative to a reference plane, means for introducing a signal representing the desired displacement of said surface at said point, and screwdriving means including a servomotor responsive to the difference between said signals for adjustably positioning at least one of said screws in the vicinity of said point until said signals are equal.

14. In apparatus for generating a three-dimensional cam, a base, a plate detachably secured to said base, a sheet-like flexible member for defining a cam surface having its edges secured to said plate, a plurality of screws threaded through said plate in a two-coordinate array intermediate said edges, said screws having heads engaging said member for adjustably displacing the same, means for detecting the displacement of said surface relative to a reference plane opposite a selected one of said screw heads, means for providing a signal proportional to the detected displacement, means for introducing a signal representing the desired displacement opposite the selected screw head, and screwdriving means including a servomotor responsive to the difference between said signals for adjusting the position of said screws successively to obtain a desired displacement opposite every one of said screw heads, whereby said plate with said cam surface may be removed from said base to serve as an accurate mold form.

15. In a function generator, the combination comprising a flexible member for defining a cam surface, a plurality of screws arranged in a two-coordinate array for adjustably displacing said member, a cam follower, servo-positioning means responsive to respective input signals for positioning said follower at a point on said surface relative to said two-coordinate array uniquely representing said signals, means associated with said follower for providing an output signal determined by the displacement of said surface at said point relative to a reference plane, for each of said input signals an adjustable source and a variable source arranged for selective connection to said servo means, an adjustable source for providing a signal representing a predetermined output value corresponding to adjusted values of the input signals, screwdriving means including a servomotor responsive to the difference between said signal representing the predetermined output value and said output signal determined by surface displacement for selectively adjusting said screws until a zero signal difference is obtained, and means for indicating the output signal obtained upon connection of said servo means with said variable signal sources.

References Cited in the file of this patent

UNITED STATES PATENTS

| | | |
|---|---|---|
| 2,336,550 | Krupfer | Dec. 14, 1943 |
| 2,618,764 | Rieber | Nov. 18, 1952 |
| 2,669,699 | Shapiro | Feb. 16, 1954 |